J. PICKERING.
Machines for Combing and Cutting Grass and Bristles.

No. 158,650.  Patented Jan. 12, 1875.

Witnesses,
Thomas P. Bewley.
Geo. E. Betzel.

Inventor.
Joseph Pickering
By His Attorney
Stephen Ustick

UNITED STATES PATENT OFFICE.

JOSEPH PICKERING, OF PHILADELPHIA, PENNSYLVANIA, ASSIGNOR OF ONE-HALF HIS RIGHT TO JOSEPH M. PICKERING, OF SAME PLACE.

IMPROVEMENT IN MACHINES FOR COMBING AND CUTTING GRASS AND BRISTLES.

Specification forming part of Letters Patent No. 158,650, dated January 12, 1875; application filed June 4, 1874.

*To all whom it may concern:*

Be it known that I, JOSEPH PICKERING, of the city and county of Philadelphia, in the State of Pennsylvania, have invented a Combined Grass and Bristle Combing and Cutting Machine, of which the following is a specification:

My invention relates in the first place to a comb, consisting of a series of curved teeth spirally arranged on the driving-shaft with washers between them, and having bevels on their front ends and edges for the purpose of feeding the material forward and separating the fibers.

In the second place it relates to the combination of a horizontal guard, with revolving cutters to keep the grass or bristles down upon the bed-plate of the machine, as it passes through the cutters for cutting it in appropriate lengths, as hereinafter fully described.

Figure 1:
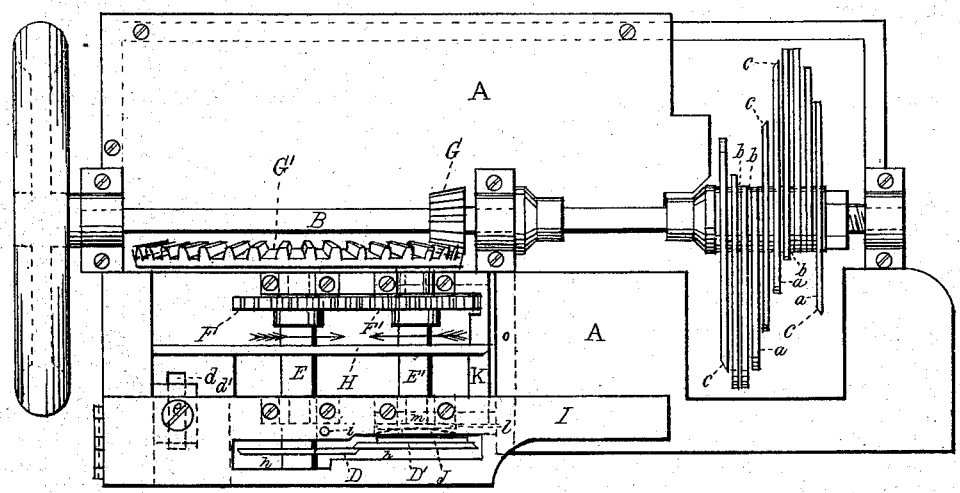
Figure 2:
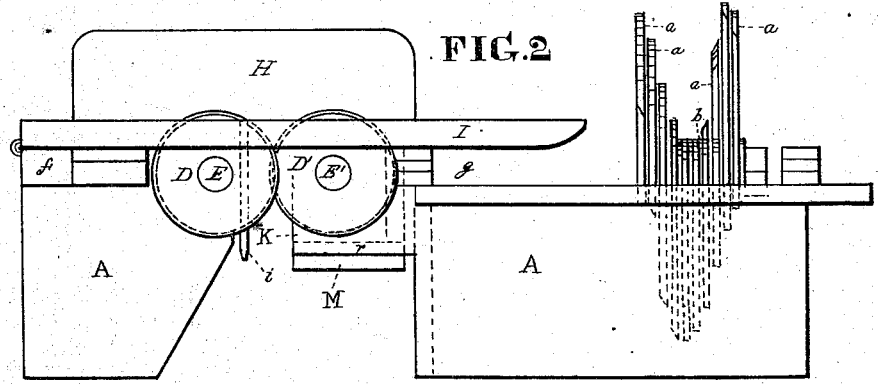
Figure 4:
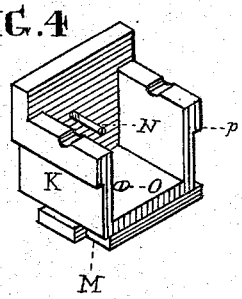
Figure 3:
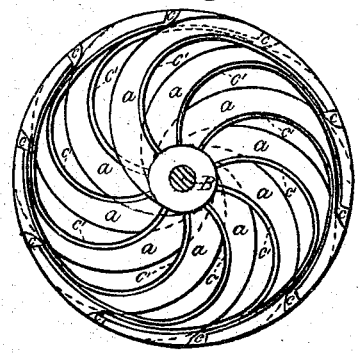
Figure 5:
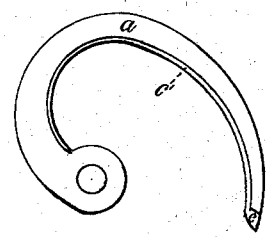

Figure 1 is a plan view of the machine. Fig. 2 is a front elevation of the same. Fig. 3 is a side view of the combing device, consisting of the curved teeth $a$ on the shaft B. Fig. 4 is an isometrical view of the adjustable box K. Fig. 5 is a side view of one of the teeth $a$.

Like letters of reference in all the figures indicate the same parts.

A is the bed-plate. B is the driving-shaft, which has a comb at one end, consisting of a series of curved teeth, $a$, separated by washers $b$. The teeth have their points spirally arranged, as seen in Fig. 3, so as to enter a bunch of grass or bristles one at a time to give ease to their operation. The bunch is held by hand during the operation of combing and cutting, being placed on the bed-plate A at the right hand of the comb, so that the teeth may enter it. The front ends of the teeth are pointed by the formation of bevels $c$, which incline to the left hand. There are bevels $c$ on the front ends of the teeth, and corresponding bevels $c'$ on their front edges, which run in the same direction for the double purpose of entering the bunch of grass or bristles, separating the material or combing it and feeding it forward, the bunch being held by hand upon the plate A, upon which it slides toward revolving cutters, hereinafter described.

There are circular cutters D and D' on the shafts E and E', which are geared together by means of the spur-wheels F and F', whereby they are revolved toward each other in the direction of the arrows for shearing the grass or bristles the proper length, the shaft E being revolved by means of its connection with the driving-shaft B, there being a bevel-pinion, G, on the driving-shaft and a corresponding wheel, G', on the shaft E. H is a gage, which is adjustable to suit any desired length for the cut material. It has a slot, $c$, in its flange $d$, through which passes the screw $e$, which confines it to the bed-plate A. I is a guard, which is hinged to the cross-strip $f$ and forms a space, $g$, below it for the passage of the material to be cut as it is brought between the revolving cutters D and D'.

As the material is pushed forward it elevates the free end of the guard until the material is brought between the cutters. The guard is then brought down by its own weight upon the material to steady it, the slot $h$ passing over the cutters. The pin $i$, which projects from the lower side of the guard acts as a stop for the material.

J is an elliptical spring, which, by means of a central opening, is placed on the shaft E between the stationary plate $l$ and the hub $m$ of the cutter to give an elastic force to the cutter D, to bear it up against the cutter D' sufficiently tight for producing a clear cut. Other descriptions of springs will answer the purpose. As the cutters D D' wear away the journal-box K is adjusted by means of the screw N, which passes into the vertical plate $o$ of the bed-plate. It is firmly secured in position by means of the screw O, which draws the front end of the clamping-board M up against the lower edge of the projection $r$, and the shoulder $p$ firmly upon the upper edge of said projection.

I claim as my invention—

1. The teeth a, having bevels c on their front ends and corresponding bevels c' on their front edges, in combination with the shaft B, on which they are spirally arranged for the double purpose of combing the grass or bristles and feeding it forward toward the cutters D and D', substantially in the manner, and for the purpose above described.

2. The slotted hinged guard I in combination with the cutters D and D', substantially in the manner and for the purpose specified.

JOSEPH PICKERING.

Witnesses:
 THOMAS J. BEWLEY,
 STEPHEN USTICK.